(12) United States Patent
Cross et al.

(10) Patent No.: US 11,488,258 B2
(45) Date of Patent: Nov. 1, 2022

(54) AUTHENTICATION, AUTHORIZATION AND AUDIT OF DIGITAL ASSETS USING THE BLOCKCHAIN

(71) Applicant: REFINITIV US ORGANIZATION LLC, New York, NY (US)

(72) Inventors: James Cross, Beckenham (GB); Kegan Dougal, London (GB); Rob Lundie Hill, St. Albans (GB); Daniel Lewington, London (GB); Richard Collin, Newick Lewes (GB)

(73) Assignee: REFINITIV US ORGANIZATION LLC, New York, NY (US)

( * ) Notice: Subject to any disclaimer, the term of this patent is extended or adjusted under 35 U.S.C. 154(b) by 336 days.

(21) Appl. No.: 16/783,967

(22) Filed: Feb. 6, 2020

(65) Prior Publication Data

US 2020/0258166 A1 Aug. 13, 2020

Related U.S. Application Data

(60) Provisional application No. 62/802,375, filed on Feb. 7, 2019.

(51) Int. Cl.
*G06Q 40/00* (2012.01)
*H04L 9/00* (2022.01)
(Continued)

(52) U.S. Cl.
CPC ............ *G06Q 40/12* (2013.12); *H04L 9/006* (2013.01); *H04L 9/0643* (2013.01);
(Continued)

(58) Field of Classification Search
CPC ....... G06Q 40/12; H04L 9/006; H04L 9/0643; H04L 9/0825; H04L 9/50; H04L 2209/56;
(Continued)

(56) References Cited

U.S. PATENT DOCUMENTS

2017/0295180 A1 10/2017 Day et al.
2018/0060496 A1* 3/2018 Bulleit ................. H04L 9/0643
(Continued)

FOREIGN PATENT DOCUMENTS

EP         3236374       10/2017
WO    2020/161662 A1    8/2020

OTHER PUBLICATIONS

International Search Report and Written Opinion dated Apr. 23, 2020, PCT Patent Application No. PCT/IB2020/050954, filed Feb. 6, 2020, European Patent Office, 14 pages.

*Primary Examiner* — Garcia Ade
(74) *Attorney, Agent, or Firm* — Pillsbury Winthrop Shaw Pittman, LLP

(57) ABSTRACT

Computer-readable media, systems and methods may improve security, authorization, and auditability of documents. For example, computer systems for serving documents may be improved to provide secure access and control through challenges that are validated with self-executing on-chain document license contracts that enforce entitlements that specify users and their authorized document actions. Such entitlements may be generated by the user who created the document. As such, a user may retain over authorizations and document actions that are permissible with respect to the document even after the user has transferred a copy of the document. Furthermore, the computer systems may be improved to write an on-chain audit log of document actions, providing an immutable record of the document actions.

17 Claims, 6 Drawing Sheets

(51) Int. Cl.
  *H04L 9/06* (2006.01)
  *H04L 9/08* (2006.01)
(52) U.S. Cl.
  CPC .............. *H04L 9/0825* (2013.01); *H04L 9/50* (2022.05); *H04L 2209/56* (2013.01)
(58) Field of Classification Search
  CPC ..... H04L 9/3239; H04L 9/3271; H04L 63/10; G06F 21/64; G06F 2221/2101; G06F 2221/2103; G06F 2221/2141; G06F 21/6209
  USPC ......................................................... 705/30
  See application file for complete search history.

(56) References Cited

U.S. PATENT DOCUMENTS

2018/0287800 A1* 10/2018 Chapman .............. H04L 9/3231
2020/0153627 A1*  5/2020 Wentz .................. H04L 9/3239

\* cited by examiner

US 11,488,258 B2

AUTHENTICATION, AUTHORIZATION AND AUDIT OF DIGITAL ASSETS USING THE BLOCKCHAIN

RELATED APPLICATIONS

This application claims priority to U.S. Provisional Patent Application No. 62/802,375, filed on Feb. 7, 2019, the content of which is incorporated by reference in its entirety herein.

BACKGROUND

When supplying a digital asset to an organization or others, the supplier of the digital asset may lose control over the digital asset. For example, a user may email or upload a document to another user and/or a document server and be unable to control use of the digital asset, who is able to access the digital asset, or how the digital asset may be accessed for modification.

SUMMARY

The disclosure relates to computer-readable media, systems and methods that improve the security, access, and auditability of computer systems and digital assets stored on and shared from the computer systems. Such improvements may result in enhanced control over and security of digital assets. The term "digital asset" may refer to electronic data that may be stored and shared (transmitted) between devices. Digital assets may include word processing files, spreadsheet files, images, videos, audio files, software code, and/or other electronic data. As used herein throughout, the term "document" may be used interchangeably with "digital asset" for convenience of illustration. As such, "document" as used in examples herein throughout is not limited to any particular type of digital asset (such as a word processing file or audio file), but rather encompasses any type of digital asset.

An example of improving the authentication, authorization, and auditing of computer systems and digital assets (documents) will be described with reference to a user that creates a document. In connection with creating the document, the user and/or the system may generate a Document License Contract ("DLC") that, among other things, may identify users and their entitlements or authorization to conduct document actions on the document. The DLC may be stored on a distributed ledger of a blockchain network. Some or all nodes of the blockchain network may convert the DLC into bytecode for execution against blockchain transactions. When a requesting user wishes to conduct a document action such as a download, upload, deletion, modification, etc., on the document, the requesting user may be required to take and pass a blockchain-mediated challenge that is validated against the DLC. For example, the requesting user may be required to request (through a user device) initiation of the document action from a document server that stores or otherwise has access to the document. In this example, the requesting user's user device may be programmed with an agent such as a web browser that interfaces with the document server or an email application that accesses document attachments.

In any event, the document server may provide the user device with the challenge, which may include a nonce. The nonce may be a unique value that is provided to the user device as part of the challenge. The user device may generate a blockchain transaction that includes the nonce. For example, the user device may include the nonce in a data payload of the blockchain transaction. The user device may digitally sign the blockchain transaction with a private key associated with the requesting user and may transmit the blockchain transaction to the blockchain network. One or more nodes of the blockchain network may authenticate the digitally signed blockchain transaction to verify that the requesting user actually digitally signed the blockchain transaction. The one or more nodes may further validate the blockchain transaction against the DLC to ensure that the user is entitled to perform the document action. For example, the one or more nodes may access the entitlement data stored in the DLC and execute the logic instructions of the DLC to determine whether the requesting user is permitted to perform the document action on the document. If so, the one or more nodes may write the nonce to the distributed ledger. In some examples, the one or more nodes may write the document action to an audit log of the DLC to provide an immutable audit record of the document action or other document actions performed on the document. The writing of the nonce and/or document action to the audit log may indicate that the challenge has been passed and the requesting user is entitled to perform the document action.

The user device of the requesting user may wait for the blockchain transaction to be mined (written to the distributed ledger). Once mined, the user device may transmit a second request to the document server to perform the document action. The second request may include a session identifier from the original request, the nonce, or other information that identifies the nonce so that the document server may verify whether the nonce was written to the distributed ledger, indicating that the challenge was successfully passed. If so, the document server may authorize the document action such as by providing the document, permitting an upload of the document, or facilitating other document action.

It should be noted that the foregoing example operations may be performed transparently to the requesting user. For example, the requesting user may interact via the user device with an interface of the document server to request the document. The user device may transparently (from the user's perspective) conduct the blockchain transaction to authenticate entitlement to perform the requested document action. Alternatively, the user may receive the document as an attachment to an email and the email application of the user device may conduct the blockchain transaction. In still another example, the document application may be provided with an agent such as a "MACRO" that is programmed to conduct the blockchain transaction.

BRIEF DESCRIPTION OF THE DRAWINGS

Features of the present disclosure may be illustrated by way of example and not limited in the following Figure(s), in which like numerals indicate like elements, in which.

DETAILED DESCRIPTION

The disclosure relates to document management systems that improve security, authorization, and auditability of documents. For example, computer systems for document serving may be improved to provide secure access and control through challenges that are validated with self-executing on-chain document license contracts and immutable auditing of document actions. Such control, security and auditing may facilitate compliance with General Data Protection Regulation obligations and/or other governmental or organizational compliance obligations since the systems may be improved to facilitate retention of control by a user over authorizations and document actions that are permissible with respect to the document even after the user has transferred a copy of the document.

Figure 1:
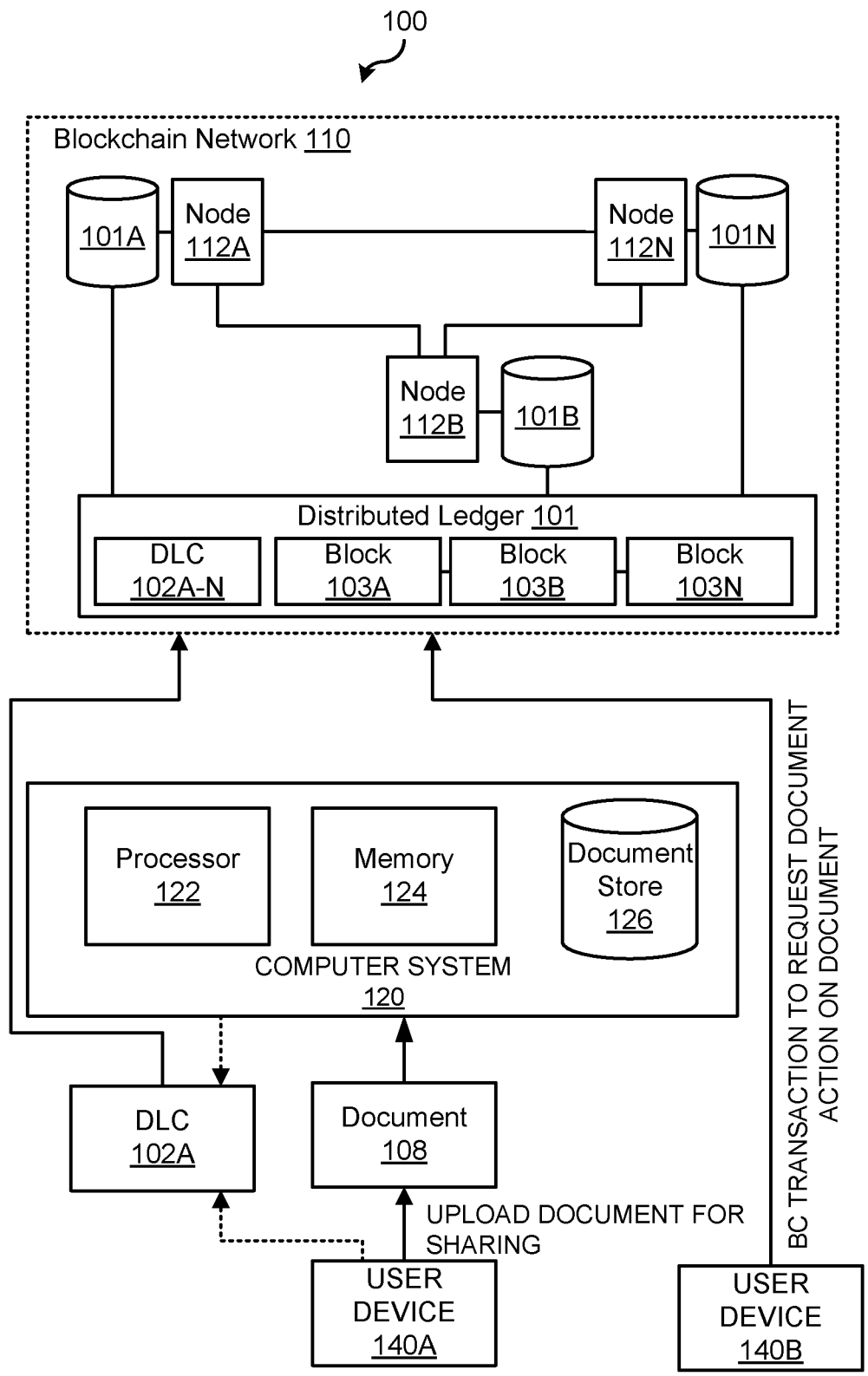
FIG. 1 illustrates a block diagram of a system for on-chain contract control and auditing of document actions for documents that may be stored off-chain, according to an example.

FIG. 1 illustrates a block diagram of a system 100 for on-chain contract control and auditing of document actions for documents that may be stored off-chain, according to an example. As used herein, the term "on-chain" may refer to storage on a distributed ledger 101 of a blockchain network 110.

The term "blockchain" may generally refer to use of a digital ledger technology ("DLT"). Thus, a "blockchain" network may include a network that employs DLT. An example of a DLT is described in the well-known white paper "Bitcoin: A Peer-to-Peer Electronic Cash System," by Satoshi Nakamoto ("http [colon] bitcoin [dot] org"), the contents of which are incorporated by reference in its entirety herein. Other DLTs may be used as well, such as the Ethereum platform, described in the white paper, "Ethereum Specification" ("https [colon] [double forward slash] github [dot] corn [forward slash] Ethereum [forward slash] wiki [forward slash] wiki [forward slash] White-Paper"), CORDA blockchain platform ("https [colon] [double forward slash] www [dot] corda [dot] net"), or QUORUM blockchain platform ("https [colon] [double forward slash] www [dot] goquorum [dot] com"), the contents of each of which is incorporated by reference in its entirety herein.

The term "document action" may refer to an action performed with respect to a document via a computer such as a user device. Examples of a document action may include a download, an upload, a deletion, a modification, a change in an entitlement and/or other action performed with respect to the document. An entitlement may include an express grant of a right to perform a document action.

System 100 may include a blockchain network 110, a computer system 120, the computer systems of various users (illustrated as user devices 140A and 140B), and/or other components.

The blockchain network 110 may include a peer-to-peer network of nodes 112 (illustrated as nodes 112A-N). Each node 112 may employ DLT, which may include a protocol for validating blockchain transactions and incorporating the data from the validated blockchain transactions into a distributed ledger 101 accessible to the nodes 112. For example, each node 112 may include a local copy (101A-N) of some or all of the distributed ledger 101. Changes made to the distributed ledger 101 by a node 112 may be shared to other nodes 112, such as a in a peer-to-peer fashion according to the DLT protocol. The distributed ledger 101 may include a series of blocks of data 103A-N that that are chained together. For example, each block 103 may be identified by a hash. Each block 103 may include a reference to a previous block's hash. In this manner, the blocks of data may be chained together.

In some examples, users may submit a blockchain transaction through a respective blockchain interface (not illustrated) for validation and storage on the distributed ledger 101. Such blockchain transaction may be to request verification of entitlement to a document action, request a modification to the entitlements, and/or otherwise request that data be validated and recorded on the distributed ledger 101. Each blockchain interface may be configured as an electronic wallet provided to each user. Each wallet may be assigned with or otherwise generate a public key and a private key. The private key may be held in secret by each wallet while the public key may publicly available to identify the corresponding wallet. Each wallet may further be associated with an address (which may be derived from the public key via a hashing algorithm such as the Secure Hash Algorithm 256 (SHA-256) and the RACE Integrity Primitives Evaluation Message Digest 160 (RIPEMD-160)). The address may include an identifier that identifies the wallet. Thus, each user may be associated with a private key stored in the user's electronic wallet on a user device 140 or other secure location, a public key, a wallet address, and/or other blockchain-related information of the user. In these examples, data digitally signed with a user's private key may be verified by using the publicly available public key. Thus, a blockchain transaction that is digitally signed by a user using the user's private key may be publicly verified using the corresponding public key.

In some examples, a web browser of a user device 140 may act as a browser-based wallet. In some of these examples, the browser-based wallet may not store the private key but rather may receive an encrypted private key from a key server (not illustrated). As such, the user device 140 may, via the browser-based wallet, decrypt the encrypted private key and digitally sign the blockchain transaction with the decrypted private key. Examples of the foregoing are described in U.S. patent application Ser. No. 15/696,996, filed Sep. 6, 2017, and entitled "Systems and Methods for Providing Identity Assurance for Decentralized Applications," the content of which is incorporated by reference in its entirety herein.

In some examples, when a blockchain transaction is broadcast to the blockchain network 110 by a sender (a user that broadcasts the blockchain transaction), the blockchain transaction may be stored in a blockchain transactions store accessible to the nodes 112. The sending user may digitally sign the blockchain transaction with the sender's private key. The blockchain network 110 may verify the blockchain transaction by using the sender's public key to verify that the sender actually signed the blockchain transaction. Other consensus validation processing may be performed as well.

Once validated and the entitlement authorization described below has been verified, the blockchain transaction may be accepted by consensus and written to a block 103, which is added to the distributed ledger 101. The blockchain transaction may be grouped with other blockchain transactions into a single block 103. A node 112 may process one or more of the blockchain transactions in the transactions store for entry into the distributed ledger 101.

For example, the node 112 may verify the blockchain transactions to ensure that they were digitally signed by the sending user, and ensure other requirements specified in the document license contract have been met. Once the node processes (via its node processor similar to processor 122) and validates the blockchain transaction(s), then the node 112 may write the blockchain transaction(s) and their corresponding data payloads, which may then be propagated to the other nodes 112 in a peer-to-peer manner.

In some examples, the blockchain network 110 may include a private blockchain that is accessible only to users that are expressly granted access. In these examples, an entity that wishes to share documents among authorized users may employ the system 100 within its computer environment and/or other computer environments in which documents are to be shared. In some examples, the blockchain network 110 may include a public blockchain that is accessible to all users who wish to share documents with other users in a controlled manner.

The computer system 120 may include a processor 122, a memory 124, a document store 126, and/or other components. The processor 122 may include a semiconductor-based microprocessor, a central processing unit (CPU), an application specific integrated circuit (ASIC), a field-programmable gate array (FPGA), and/or other suitable hardware device. The memory 124 may have stored thereon machine-readable instructions (which may also be termed computer readable instructions) that program the processor 122 (and therefore computer system 120) to execute various functions described herein with respect to the computer system 120. The memory 124 may be an electronic, magnetic, optical, or other physical storage device that includes or stores executable instructions. The memory 124 may be, for example, Random Access memory (RAM), an Electrically Erasable Programmable Read-Only Memory (EEPROM), a storage device, an optical disc, and the like. The memory may be a non-transitory machine-readable storage medium, where the term "non-transitory" does not encompass transitory propagating signals.

In some examples, the computer system 120 may include a document management system including a document server that receives documents from users for sharing with other users. The computer system 120 may use the blockchain network 110 to determine whether a given document action on a document 108 is permitted and recording an audit log of document actions in the distributed ledger 101. In this manner, authorization of document actions may be mediated by DLT (e.g., via blockchain) and immutably audited via the distributed ledger 101. Thus, the control, security, robustness, and transparent auditability of a document management system may be improved.

In some examples, authorization and auditing of document actions on a document 108 may be authorized against a Document License Contract ("DLC") 102 corresponding to the document 108. A DLC 102 may refer to an electronic asset that may store data and/or a set of instructions that encodes logic that may be executed by computer device to automatically determine entitlements with respect to a given document 108. For example, a DLC 102 may store data that includes entitlement information and instructions that determine whether a given user is entitled to perform a document action on a document based on the entitlement information. The entitlement information may include identifying information for one or more users and a list of one or more document actions that each user is entitled to take with respect to a document 108 to which the DLC 102 pertains. The identifying information may include a public key of each user, a wallet address of each user, and/or other user-identifying information. The DLC 102 may further include instructions that are executed to take as input user-identifying information, compare the user-identifying information to the encoded information and output information indicating whether the user identified by the user-identifying information is entitled to perform a requested document action. As such, a DLC 102 may be used to automatically determine whether a given user is entitled to perform a requested document action on a document 108.

In some examples, a DLC 102 may be compiled or otherwise converted into bytecode that is executed on a blockchain virtual machine. In some examples, the DLC 102 may be stored on the distributed ledger 101, thereby being accessible to each node 112 via its local copy of the distributed ledger 101. As such, a given node 112 may convert the DLC 102 into and execute the bytecode on a blockchain virtual machine instantiated by the node for determining entitlements with respect to a given document 108.

In some examples, a DLC 102 may govern multiple documents (such as all documents from a user, all documents referring to a group of users, etc.). In this sense, a given user or group of users may specify a given DLC 102 to govern documents created by the user or group of users. In some examples, multiple DLCs 102 may govern a single document. In this example, one DLC 102 may govern a first portion of a document while a second DLC 102 may govern a second portion of a document (to the extent that a document is segmented into portions each of which may be subject to control by a corresponding DLC 102).

In some examples, each user device 140 may include an agent for interacting with the blockchain network 110 and/or the computer system 120. The agent may include a web browser or other application that includes scripts that interface with the blockchain network 110 and/or the computer system 120 and/or a wallet application that stores private and public keys of the user.

Example operations of uploading a document for sharing will be described with reference to FIG. 2 and example operations of determining entitlements for document actions on the document will be described with reference to FIG. 3.

Figure 2:
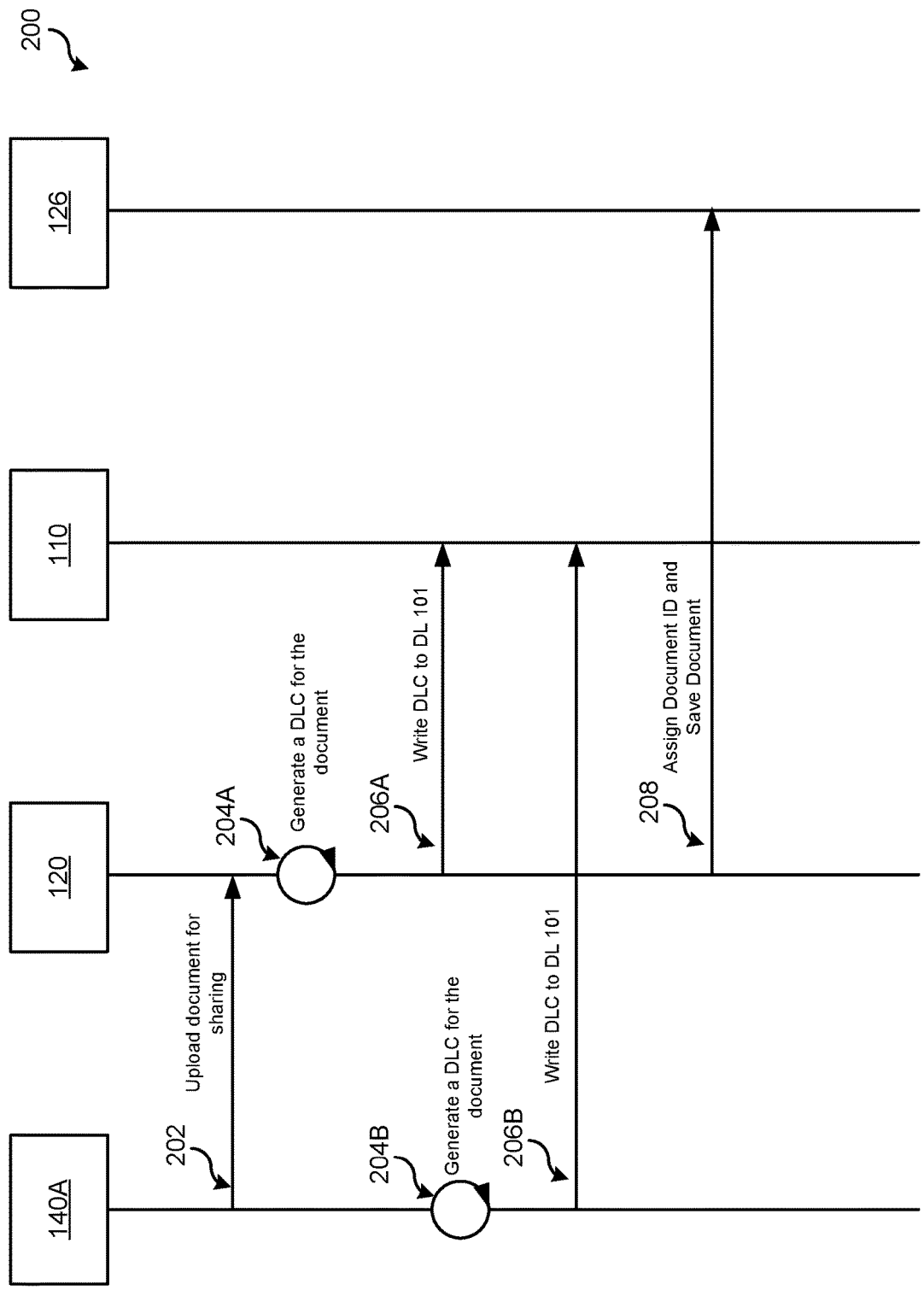
FIG. 2 illustrates a flow diagram of an example data flow of uploading a document for sharing and generating an on-chain document license contract for the document, according to an example.

FIG. 2 illustrates a flow diagram 200 of an example data flow of uploading a document (such as document 108 illustrated in FIG. 1) for sharing and generating an on-chain document license contract (such as a DLC 102A illustrated in FIG. 1) for the document, according to an example.

At 202, a document 108 uploaded from a user device 140A for sharing with other users (such as through a user device 140B) may be associated with a corresponding DLC 102 (illustrated as DLC 102A-N).

A DLC 102A may be generated for document 108 and information that identifies the DLC 102A for the document 108 may be stored.

The DLC 102 may be generated at 204A by the computer system 120 and/or at 204B by the user device 140A. If generated by the computer system 120 at 204A, the user device 140A may provide DLC parameters that specify the entitlement information to the computer system 120.

In some examples, a storage address or other identifier of the DLC 102A may be used as a document identifier for the document 108. Alternatively, or additionally, a separate document identifier may be generated for the document 108 and the document identifier may be stored in association with an identifier and/or address of the DLC 102A.

Depending on whether the DLC 102A is generated at 204A or 204B, the DLC 102A may be written to the distributed ledger 101 via the blockchain network 110 at 206A or 206B. For example, at 206A, the computer system 120 may generate a blockchain transaction that includes the DLC 102A. Alternatively, or additionally, at 206B, the user device 140A may generate the blockchain transaction that includes the DLC 102A. In either event, the blockchain network 110 (the nodes 112 of the blockchain network 110) may store the DLC 102A via the distributed ledger 101. For example, a node 112 of the blockchain network 110 may store the DLC 102A the DLC 102A in its local copy 101A-N of the distributed ledger, and may propagate the local copy to other nodes 112 according to the particular DLT protocol used by the blockchain network 110.

At 208, the computer system 120 may assign a document identifier (ID) to the document 108. The document ID may be an auto-incremented unique number, an address on the distributed ledger 101 to identify the DLC 102A stored at the distributed ledger, and/or other unique identification information. If the document ID is an auto-incremented unique number (or other ID other than an address of the corresponding DLC 102), the document ID may be stored in association with the address at which the DLC 102A is stored. Such storage may itself be on the distributed ledger 101 so that each node 112 may, given an input document ID, identify a corresponding DLC 102. In implementations in which the document ID is the address of the corresponding DLC 102, each node 112 may identify the corresponding DLC 102 based on the document ID. Once the document ID has been assigned, the computer system 120 may store the document in the document store 126.

Figure 3:
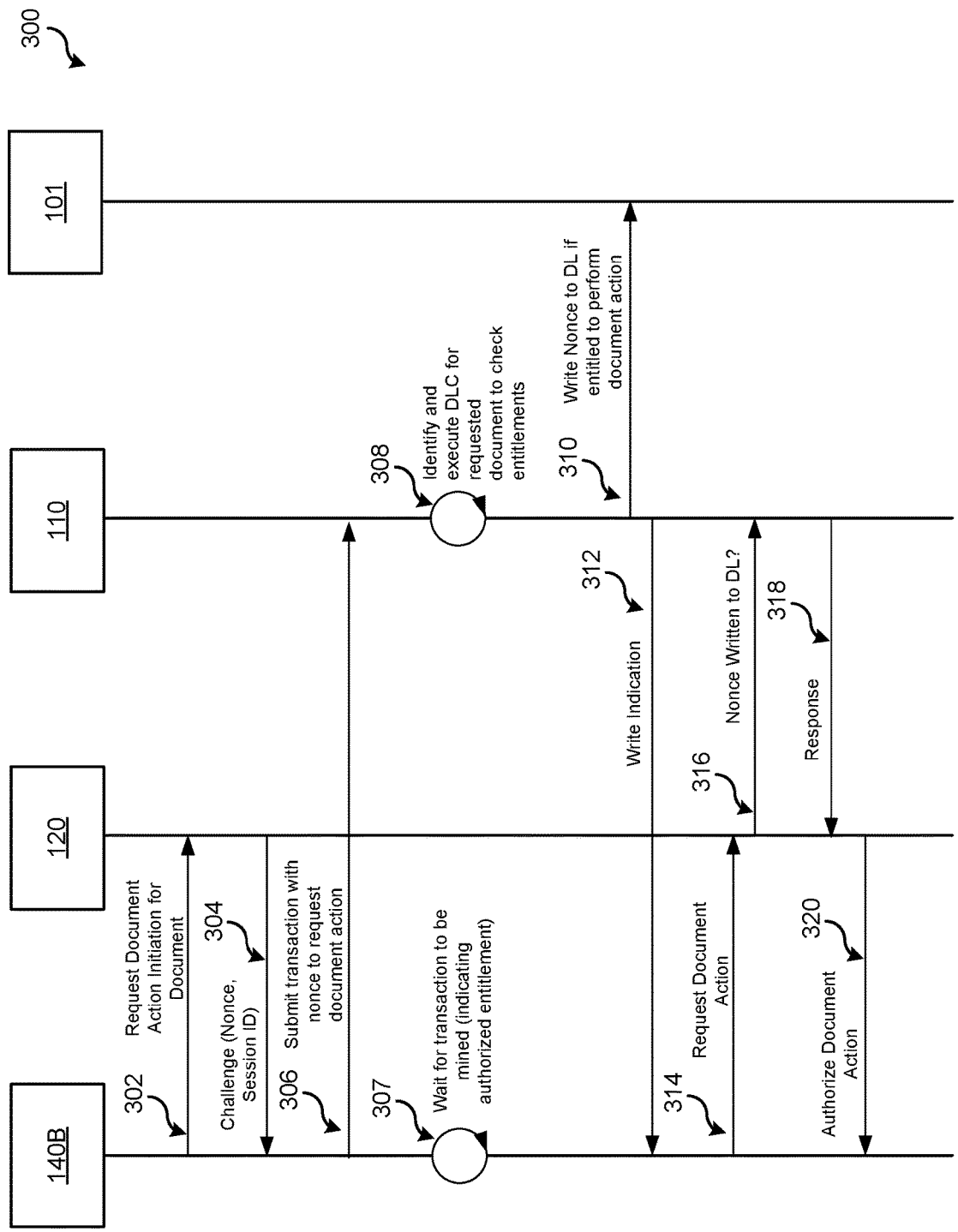
FIG. 3 illustrates a flow diagram of an example data flow of requesting a document action, authenticating entitlements to perform the document action, and auditing the document action via a distributed ledger, according to an example.

FIG. 3 illustrates a flow diagram 300 of an example data flow of requesting a document action, authenticating entitlements to perform the document action, and auditing the document action via a distributed ledger 101, according to an example.

At 302, the computer system 120 may receive, from a user (via user device 140B), a request for a document action initiation for a document, such as document 108 illustrated in FIG. 1. A request for document action initiation may refer to an electronic communication that requests initiation of a process to verify an entitlement to perform the document action. The request for the document action initiation may include a document ID and user-identifying information of the user that is requesting verification of the entitlement to the document action.

At 304, the computer system 120 may provide, responsive to the request, a challenge. A challenge may refer to an electronic communication that includes data to be used by the sender of the request for document action initiation for requesting entitlement verification for the document action. The challenge may include a nonce, a session identifier, and/or other data relating to the request for document action initiation. The nonce may include a unique identifier generated by the computer system 120. The session identifier may include an identifier that uniquely identifies an interaction between the computer system 120 and the user device 140B in connection with the interaction between the computer system 120 and the user device 140B. In some examples, the computer system 120 may store the challenge in a data store for later retrieval to track requests for document action initiations.

At 306, the user device 140A may submit a blockchain transaction, to the blockchain network 110, to request verification of entitlement to perform the document action. The blockchain transaction may include the nonce, user identifying information, and/or other information. The user identifying information may include a blockchain address of a user requesting the document action, a public key of the user, and/or other identifying information. The blockchain transaction may include a digital signature associated with the blockchain address. For example, the blockchain transaction may be digitally signed by a private key of the user requesting the document action.

At 307, the user device 140B may wait for the blockchain transaction to be mined, thereby being written to the distributed ledger 101.

At 308, the blockchain network 110 may receive the blockchain transaction from the user device 140B. For example, a node 112 or other device associated with the blockchain network 110 may store the blockchain transaction into a transaction pool accessible by the nodes 112 of the blockchain network 110. One or more nodes 112 may periodically access the transaction pool to select blockchain transactions.

A given node 112 may, for example, access the blockchain transaction from the user device 140B, and identify and execute the corresponding DLC 102A for the document 108 identified by the document ID of the blockchain transaction. For example, the document ID may be an address of the DLC 102A in certain implementations, in which case the node 112 may identify and access the DLC 102 based on the address. Alternatively, in implementations for which the document ID is a unique number other than the address of the DLC 102A, the node 112 may look up the corresponding DLC 102A in a document-DLC lookup store (not illustrated), which may be populated when the document 108 is created and/or uploaded for sharing via the computer system 120.

The node 112 may execute the DLC 102A. For example, a processor of the node 112 may execute a bytecode instantiation of the DLC 102A. Thus, in this sense, the instantiation of the DLC 102A may program the node 112 to perform the logical instructions encoded by the DLC 102A. DLC 102A may take as input data that identifies the user requesting the document action (such as the public key and/or blockchain address), the document ID, the document action requested, and/or other input data. The logical instructions of the DLC 102A may be executed to compare the input data with the data stored in the DLC 102A to determine whether the user is entitled to perform the document action. It should be noted that the DLC 102A may include other functions as well.

At 310, the node 112 may write the nonce to the distributed ledger 101 if the user is entitled to the document action on the document 108. Such writing may be written via consensus with other nodes 112 according to the DLT protocol used by the blockchain network 110. In some examples, the nonce may be written to the distributed ledger 101 by writing the blockchain transaction with the nonce to the distributed ledger 101. In some examples, the nonce may be written to the distributed ledger 101 by writing to an audit log of the DLC 102A.

At 312, the blockchain network 110 may provide a write indication to the user device 140B. Such write indication may include an update to the transaction pool (such as removing the transaction or otherwise indicating that the transaction was already processed) to indicate that the blockchain transaction was written to the distributed ledger 101. It should be noted that the transaction pool may be updated to indicate that the transaction was processed even if the transaction was not written to the distributed ledger 101, indicating that the user is not entitled to perform the document action. In some examples, the blockchain network 110 may not provide a write indication to the user device 140B. In these instances, the user device 140B may query a node 112 to determine whether the blockchain transaction is present on the local copy 101A-N of the distributed ledger 101 of the node or the user device 140B itself may store its own local copy 101A-N.

At 314, once the user device 140B obtains a write indication, indicating that the blockchain network 110 has verified entitlement by the user to perform the document action, the user device 140B may transmit a request for the document action to the computer system 120. The request for the document action may include information identifying the nonce provided in the challenge (from operation 304). The information identifying the nonce may include the session ID or the nonce itself.

At 316, the computer system 120 may identify the nonce (through the provided session ID and/or the nonce itself) and determine whether the nonce has been written to the distributed ledger 101. For example, the computer system 120 may query a node 112 to determine whether the nonce has been written on the local copy 101A-N of the distributed ledger 101 of the node or the computer system 120 itself may store its own local copy 101A-N.

At 318, the computer system 120 may receive an indication from the blockchain network 110 of whether or not the user is entitled to the document action for the document 108B. For example, the computer system 120 may receive an indication of whether or not the nonce has been written to the distributed ledger 101.

At 320, the computer system 120 may authorize the document action responsive to an indication that the user is entitled to the document action for the document 108B such as the nonce being written to the distributed ledger 101. If the document action is a download of the document 108, the computer system 120 may access the document store 126 to retrieve and provide the document to the user device 140B. If the document action is an upload of the document 108, the computer system 120 may access the document 108B from the user device 140B and save the document in the document store 126. It should be noted that for uploads, the document 108 may have been modified, in which case the computer system 120 may generate an updated document hash of the document 108 and upload the document hash for storing in the appropriate DLC 102A. Other document actions may be similarly authorized and conducted. It should be noted that one or more of the operations of the flow diagram 300 may be repeated to perform serial document actions, such as a download and then subsequent upload of the document 108.

Although not illustrated, each node 112 and each user device 140 may include a processor (similar to processor 122) and a memory (similar to memory 124) that stores instructions that program the processor to perform various operations of the node or user device described herein.

Figure 4:
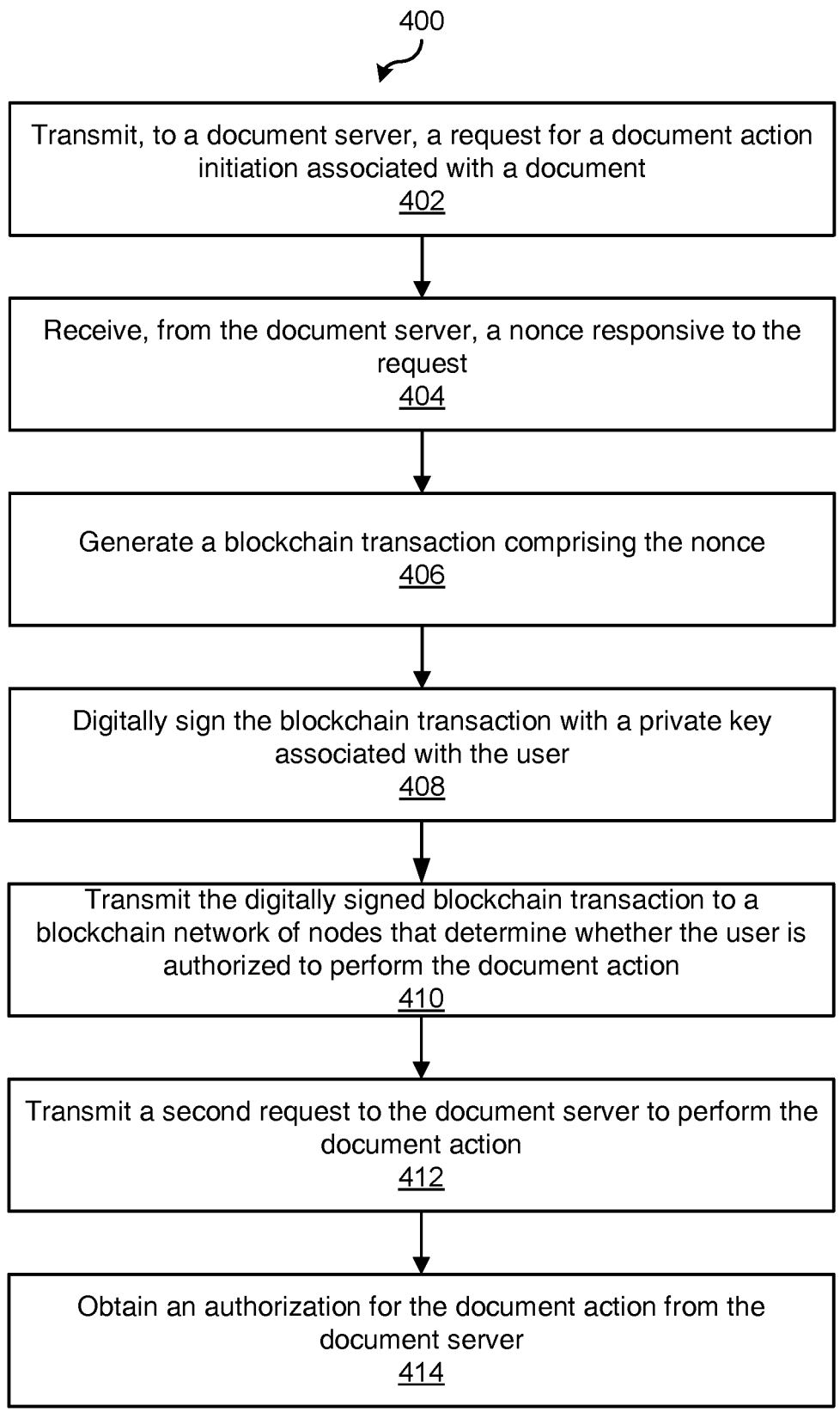
FIG. 4 illustrates a flow diagram of an example method of requesting a document action, according to an example.

FIG. 4 illustrates a flow diagram of an example method 400 of requesting a document action, according to an example. At 402, the method 400 may include transmitting, to a document server (such as a server of computer system 120), a request to initiate a document action procedure associated with a document (such as document 108). At 404, the method 400 may include receiving, from the document server, a nonce responsive to the request. At 406, the method 400 may include generating a blockchain transaction comprising the nonce.

At 408, the method 400 may include digitally signing the blockchain transaction with a private key associated with the user. In some examples, the method 400 may obtain the private key from storage that is accessible to the method. In other examples, the method 400 may receive, from a remote computer, an encrypted version of the private key and decrypt the private key. The method 400 may thereby digitally sign the blockchain transaction with the decrypted private key.

At 410, the method 400 may include transmitting the digitally signed blockchain transaction to a blockchain network (such as blockchain network 110) of nodes (such as nodes 112) that determine whether the user is authorized to perform the document action.

At 412, the method 400 may include transmitting a second request to the document server to perform the document action. At 414, the method 400 may include obtaining an authorization for the document action from the document server. In some examples, the authorization may include a download of the document (if the document action is a download).

In some examples, subsequent document actions may be performed. For example, if the document action requested at 402 is a download action, the method 400 may include subsequent document actions such as an upload. To illustrate, the method 400 may include accessing a modified version of the document. For example, a user may have downloaded and modified the document. The user may then wish to upload the modified document back to the document server. To do so, the method 400 may be invoked to request a document action comprising an upload rather than a download. Operations 402 to 412 may be repeated for the "upload" document action and if authorized may upload the modified version to the document server. In some instances, the user may be authorized to perform a download but not an upload. In these instances, the blockchain transaction submitted by the user to authorize entitlement to upload the document may not be written to the distributed ledger, which may result in the document server denying the document upload.

It should be further noted that entitlement information may be modified from time to time. To do so, an authorized user (e.g., authorized by the entitlement information to modify the entitlement information) may submit a blockchain transaction or otherwise modify the entitlement information to add or remove users, add, remove, or otherwise modify entitlements of each user, and/or perform other changes to the entitlement information of a document license contract.

Figure 5:
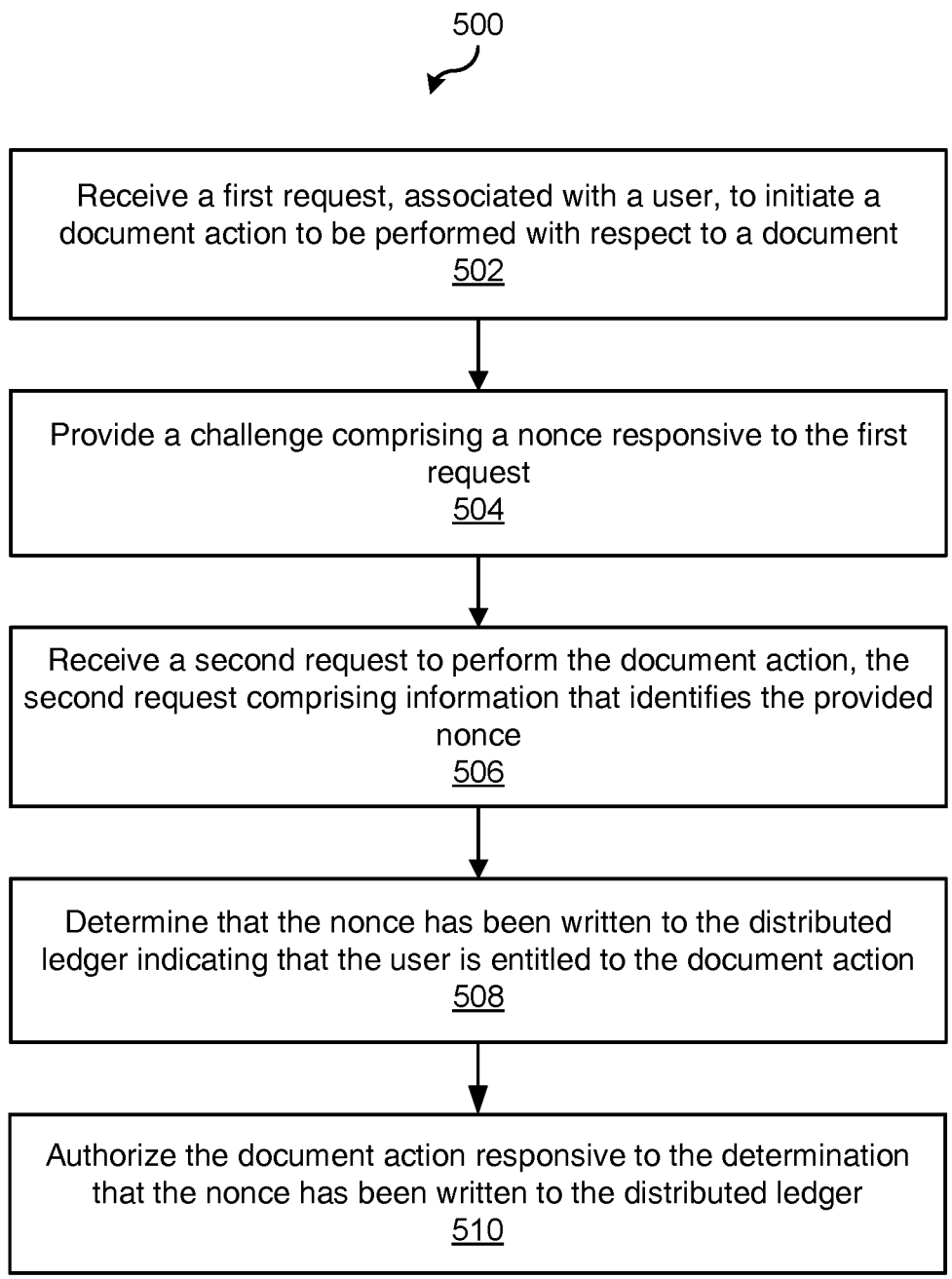
FIG. 5 illustrates a flow diagram of an example method of authorizing a request for a document action via blockchain, according to an example.

FIG. 5 illustrates a flow diagram of an example method 500 of authorizing a request for a document action via blockchain, according to an example. At 502, the method 500 may include receiving a first request, associated with a user, to initiate a document action to be performed with respect to a document (such as document 108). At 504, the method 500 may include providing a challenge comprising a nonce responsive to the first request. At 506, the method 500 may include receiving a second request to perform the document action, the second request comprising information that identifies the provided nonce. In some examples, the method 500 may include generating, responsive to the first request, a session identifier that tracks the first request and subsequent responses to the first request. The session identifier may be stored in association with the nonce such that the session identifier may be used to identify a corresponding nonce. Thus, in these examples, the method 500 may include identifying the nonce based on the session identifier.

At 508, the method 500 may include determining that the nonce has been written to a distributed ledger (such as distributed ledger 101) indicating that the user is entitled to the document action based on a validation of a blockchain transaction that includes the nonce using a document license contract that specifies user entitlements with respect to the document. At 510, the method 500 may include authorizing the document action responsive to the determination that the nonce has been written to the distributed ledger.

In some examples, the method 500 may further include providing the document responsive to a document action that includes a download of the download. In these examples, the method 500 may include receiving an updated version of the document (such as when the user has modified the downloaded document). Upon receipt of the updated version, the method 500 may include generating a revised hash digest based on the updated version and updating the document license contract with the revised hash digest.

In some examples, prior to operation 502 (which may initiate a request to perform a document action on a document) the method 500 may include receiving an upload of the document for sharing. For example, the document may be uploaded by a user for sharing with other users, whose devices may then request access to the document via operations 502-510. To facilitate intake of the uploaded document for sharing, the method 500 may including generating a hash digest based on the document. The hash digest may be generated by a hashing algorithm that deterministically generates a generally unique output based on an input. For example, the hashing algorithm may include the SHA-256 algorithm, although others may be used as well. To further facilitate document intake, the method 500 may include accessing a document identifier for the document. The document identifier may be generated at the time of upload or may be assigned based on an address at which a corresponding document license contract (such as DLC 102A) is stored. The method 500 may further include accessing entitlement information identifying one or more users and a respective set of one or more document actions that each user is entitled to perform. The entitlement information may be specified by the user that uploaded the document for sharing.

The method 500 may further include generating a document license contract for the document based on the hash digest, the document identifier, and the entitlement information. The document license contract may be executed (such as by a node 112) to validate blockchain transactions from the one or more users to determine entitlements to the document. In some examples, the method 500 may include storing the document license contract on the distributed ledger. In these examples, the document identifier may be generated based on the address of the document license contract on the distributed ledger.

In some examples, the method 500 may be implemented on multiple components of a system (such as system 100). For example, some aspects of the method 500 may be implemented at a node (such as node 112) of a blockchain network (such as blockchain network 110). In these examples, the method 500 may include receiving a blockchain transaction comprising the nonce, the blockchain transaction representing a request from the user to verify an entitlement to perform the document action. The method 500 may further including executing logic encoded in the document license contract to determine that the user is entitled to perform the document action based on the blockchain transaction.

In other examples, the executed logic may result in a determination that the user is not entitled to perform the document action. Based on a determination that the user is entitled to perform the document action, the method 500 may include writing the nonce to the distributed ledger. Such writing may indicate that the user is entitled to perform the document action. In some examples, writing the nonce to the distributed ledger may include writing the nonce and an indication of the document action to an audit log of the document license contract.

Some aspects of the method 500 may be implemented at a user device (such as user device 140B). For example, these aspects of the method 500 may include accessing (at the user device) an encrypted private key, decrypting the encrypted private key, generating a blockchain transaction comprising the nonce, digitally signing the blockchain transaction based on the decrypted private key, and submitting the digitally signed blockchain transaction to be validated via the document license contract.

Figure 6:
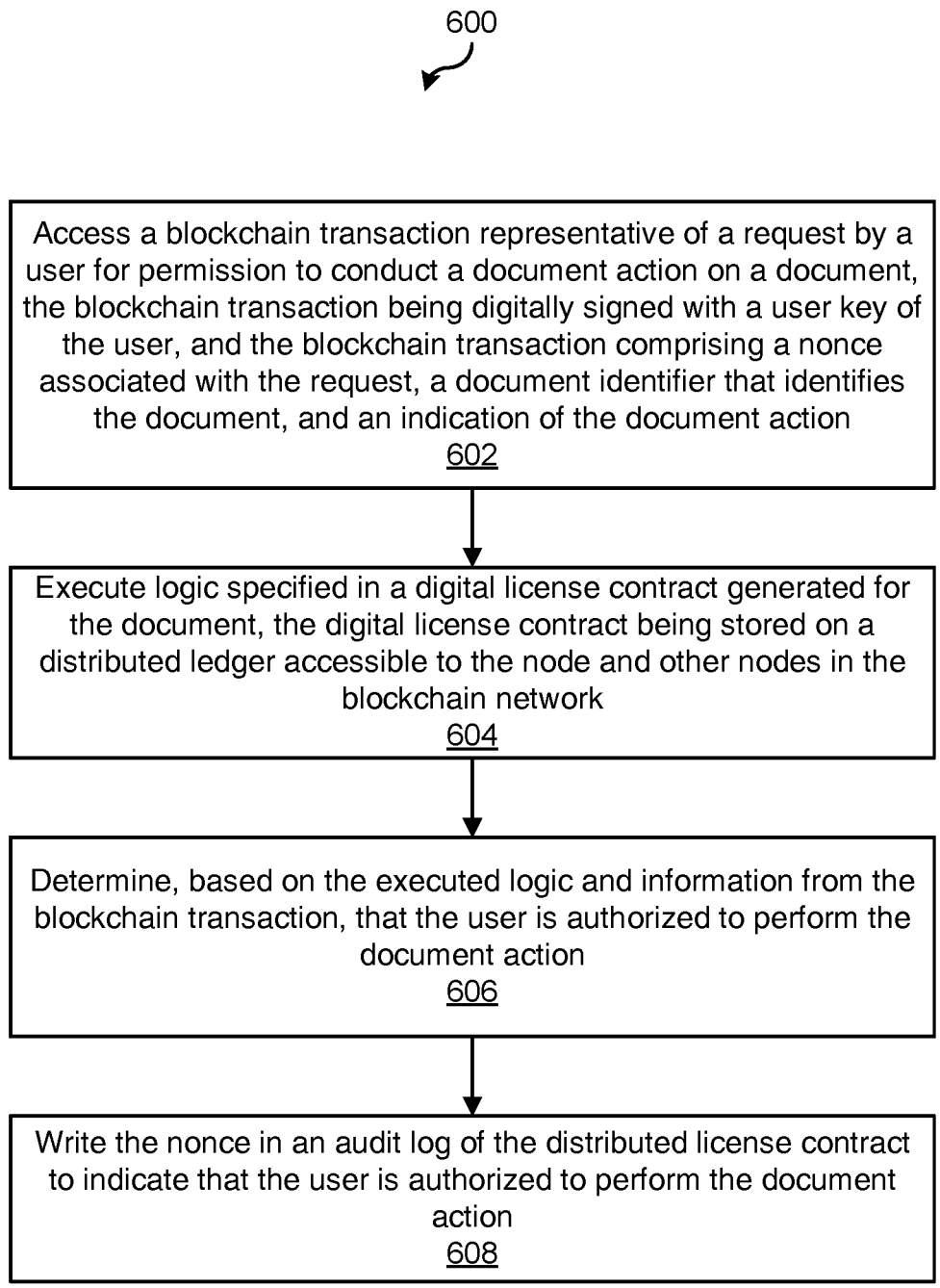
FIG. 6 illustrates a flow diagram of an example method of checking entitlements to a document action through execution of a document license contract, according to an example.

FIG. 6 illustrates a flow diagram of an example method 600 of checking entitlements to a document action through execution of a document license contract, according to an example.

At 602, the method 600 may include accessing a blockchain transaction associated with a request by a user for permission to conduct a document action on a document, the blockchain transaction being digitally signed with a user key of the user, and the blockchain transaction comprising a nonce associated with the request, a document identifier that identifies the document, and an indication of the document action. In some examples, the method 600 may include validating that the user digitally signed the blockchain transaction based on a verification of the digitally signed blockchain transaction and a public key associated with the user.

At 604, the method 600 may include executing logic specified in a document license contract generated for the document, the document license contract being stored on a distributed ledger accessible to the node and other nodes in the blockchain network. For example, the method 600 may include instantiating a blockchain virtual machine and generating bytecode based on the document license contract. To execute the logic in these examples, the bytecode may be executed via the blockchain virtual machine, such as an ETHEREUM virtual machine.

At 606, the method 600 may include determining, based on the executed logic and information from the blockchain transaction, that the user is authorized to perform the document action.

At 608, the method 600 may include writing the nonce in an audit log of the document license contract to indicate that the user is authorized to perform the document action. In some examples, the method 600 may cause the nonce to be written to the distributed ledger based on mining of the blockchain transaction.

In some examples, the method 600 may further include receiving, from a document server (such as a document server of computer system 120) that generated the nonce, a request to determine whether the nonce has been written to the audit log, and providing an indication that the nonce has been written to the audit log responsive to the request.

It should be understood that the methods 400-600 illustrated in FIGS. 4-6 may each include additional operations and that some of the operations described therein may be removed and/or modified without departing from the scopes of the methods 400-600. The description of the methods 400-600 may be made with reference to the features depicted other figures for purposes of illustration. Some or all of the operations set forth in each of the methods 400-600 may be performed by one or more of the components illustrated in FIGS. 1-3. As such, some or all of the operations set forth in each of the methods 400-600 may be included as circuitry, utilities, programs, or subprograms, in any desired computer accessible medium. In addition, each of the methods 400-600 may be embodied by computer programs, which may exist in a variety of forms. For example, some operations of each of the methods 400-600 may exist as computer-readable instructions, including source code, object code, executable code or other formats.

For simplicity and illustrative purposes, the disclosure included descriptions that may refer to examples. In the description, numerous specific details have been set forth in order to provide a thorough understanding of the present disclosure. It will be readily apparent however, that the disclosure may be practiced without limitation to these specific details. In other instances, some methods and structures have not been described in detail so as not to unnecessarily obscure the present disclosure.

Throughout the disclosure, the terms "a" and "an" may be intended to denote at least one of a particular element. As used herein, the term "includes" means includes but not limited to, the term "including" means including but not limited to. The term "based on" means based at least in part on.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. As such, the disclosure is intended to be defined by the following claims—and their equivalents—in which all terms are meant in their broadest reasonable sense unless otherwise indicated.

What is claimed is:

1. A system to facilitate blockchain-mediated and secure document management using a distributed ledger, the system comprising:
a computer system comprising a processor programmed to:
receive, from a user device associated with a user, a first request to initiate a document action to be performed with respect to a document;
provide, to the user device, a challenge comprising a nonce responsive to the first request, wherein the device is to initiate a blockchain transaction that includes the nonce and is digitally signed using a private key associated with the user,
wherein the digitally signed blockchain transaction is to be verified by one or more nodes of a blockchain network that are to evaluate whether the user is entitled to the document action based on logic encoded in a document license contract, the document license contract storing entitlement information that specifies access to the document, wherein the nonce is written to the distributed ledger responsive to a determination that the user is entitled to the document action based on the one or more entitlements;
receive, from the user device, a second request to perform the document action, the second request comprising information that identifies the provided nonce;
determine that the nonce has been written to the distributed ledger indicating that the user is entitled to the document action; and
authorize the document action responsive to the determination that the nonce has been written to the distributed ledger.

2. The system of claim 1, wherein the processor is further programmed to:
receive an upload of the document;
generate a hash digest based on the document;
access a document identifier for the document;
access the entitlement information identifying one or more users and a respective set of one or more document actions that each user is entitled to perform; and
generate the document license contract for the document based on the hash digest, the document identifier, and the entitlement information, the document license contract being used to validate blockchain transactions from the one or more users to determine entitlements to the document.

3. The system of claim 2, wherein the document license contract is stored on the distributed ledger, and wherein the processor is further programmed to:
generate the document identifier based on an address of the document license contract on the distributed ledger.

4. The system of claim 2, further comprising:
a node from among the one or more nodes in the blockchain network, the node being communicably coupled to the computer system, the node comprising a node processor programmed to:
receive the blockchain transaction comprising the nonce, the blockchain transaction representing a request from the user to verify an entitlement to perform the document action;
execute logic encoded in the document license contract to determine that the user is entitled to perform the document action based on the blockchain transaction; and
write the nonce to the distributed ledger based on the determination that the user is entitled to perform the document action.

5. The system of claim 4, wherein the document license contract is stored on the distributed ledger, and wherein to write the nonce to the distributed ledger, the node is further programmed to:
write the nonce and an indication of the document action to an audit log of the document license contract.

6. The system of claim 2, wherein the processor is further programmed to:
receive an updated version of the document;
generate a revised hash digest based on the updated version; and
update the document license contract with the revised hash digest.

7. The system of claim 1, wherein the processor is further programmed to:
generate a session identifier responsive to the first request, wherein the information used to identify the nonce comprises the session identifier.

8. The system of claim 1, further comprising:
the user device, the user device programmed to:
access an encrypted private key;
decrypt the encrypted private key;
generate the blockchain transaction comprising the nonce;
digitally sign the blockchain transaction based on the decrypted private key; and
submit the digitally signed blockchain transaction to be validated via the document license contract.

9. The system of claim 1, wherein the document action comprises a download action and wherein the processor is further programmed to:
receive a third request, associated with the user, to initiate a second document action for the document, the second document action being an upload of the document;
provide a second challenge comprising a second nonce responsive to the second request;
receive a fourth request to perform the second document action, the fourth request comprising information that identifies the second nonce;
determine that the second nonce has not been written to the distributed ledger indicating that the user is not entitled to the second document action; and
reject the second document action.

10. A method to facilitate blockchain-mediated and secure document management using a distributed ledger, the method comprising:
receiving, by a processor of a computer system, a first request, from a user device associated with a user, to initiate a document action to be performed with respect to a document;
providing, by the computer system, to the user device, a challenge comprising a nonce responsive to the first request, wherein the user device is to initiate a blockchain transaction that includes the nonce and is digitally signed using a private key associated with the user, wherein the digitally signed blockchain transaction is to be verified by one or more nodes of a blockchain network that are to evaluate whether the user is entitled to the document action based on logic encoded in a document license contract (DLC), the DLC storing one or more entitlements to the document, wherein the nonce is written to the distributed ledger responsive to a determination that the user is entitled to the document action based on the one or more entitlements;
receiving, by the computer system, from the device, a second request to perform the document action, the second request comprising information that identifies the provided nonce;
determining, by the computer system, that the nonce has been written to the distributed ledger indicating that the user is entitled to the document action; and
authorizing, by the computer system, the document action responsive to the determination that the nonce has been written to the distributed ledger.

11. The method of claim 10, further comprising:
receiving an upload of the document;
generating a hash digest based on the document;
accessing a document identifier for the document;
accessing the entitlement information, and a respective set of one or more document actions that each user is entitled to perform; and
generating the document license contract for the document based on the hash digest, the document identifier, and the entitlement information, the document license contract being used to validate blockchain transactions from the one or more users to determine entitlements to the document.

12. The method of claim 11, wherein the document license contract is stored on the distributed ledger, and wherein the method further comprises:
generating the document identifier based on an address of the document license contract on the distributed ledger.

13. The method of claim 10, wherein the document license contract is stored on the distributed ledger, the method further comprising:
writing the nonce and an indication of the document action to an audit log of the document license contract.

14. The method of claim 10, further comprising:
receiving an updated version of the document;
generating a revised hash digest based on the updated version; and
updating the document license contract with the revised hash digest.

15. The method of claim 10, further comprising:
generating a session identifier responsive to the first request, wherein the information used to identify the nonce comprises the session identifier.

16. The method of claim 10, further comprising:
accessing, by the user device, an encrypted private key;
decrypting, by the user device, the encrypted private key;
generating, by the user device, a blockchain transaction comprising the nonce;
digitally signing, by the user device, the blockchain transaction based on the decrypted private key; and
submitting, by the user device, the digitally signed blockchain transaction to be validated via the document license contract.

17. The method of claim 10, wherein the document action comprises a download action, the method further comprising:
receiving a third request, associated with the user, to initiate a second document action for the document, the second document action being an upload of the document;
providing a second challenge comprising a second nonce responsive to the second request;
receiving a fourth request to perform the second document action, the fourth request comprising information that identifies the second nonce;
determining that the second nonce has not been written to the distributed ledger indicating that the user is not entitled to the second document action; and
rejecting the second document action.

* * * * *